July 19, 1960 G. P. LEISTENSNIDER 2,945,263
METHOD FOR MAKING O-RING GASKETS
Filed Oct. 30, 1956 2 Sheets-Sheet 1
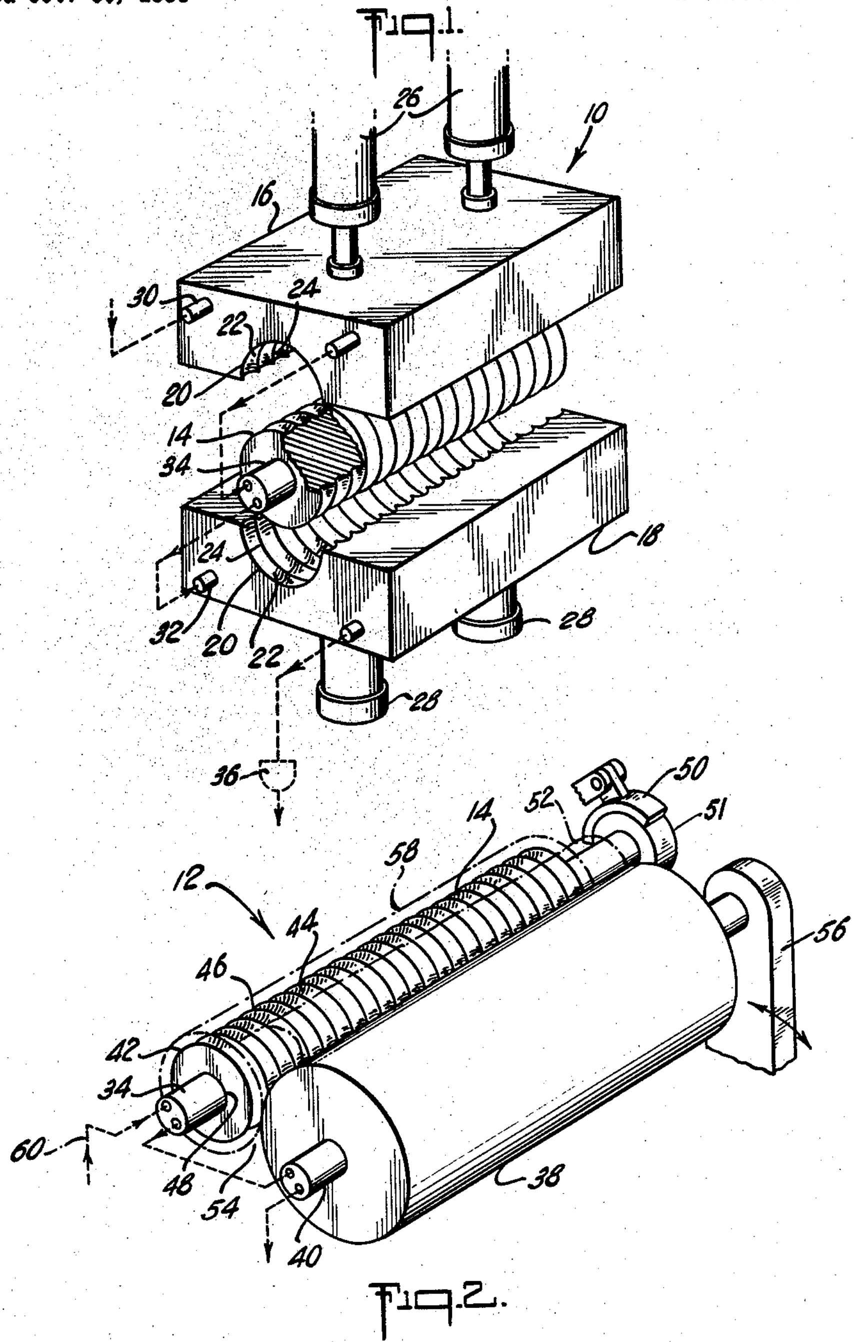
INVENTOR
GEORGE P. LEISTENSNIDER
BY Virgil C. Kline
ATTORNEY July 19, 1960 G. P. LEISTENSNIDER 2,945,263
METHOD FOR MAKING O-RING GASKETS
Filed Oct. 30, 1956 2 Sheets-Sheet 2
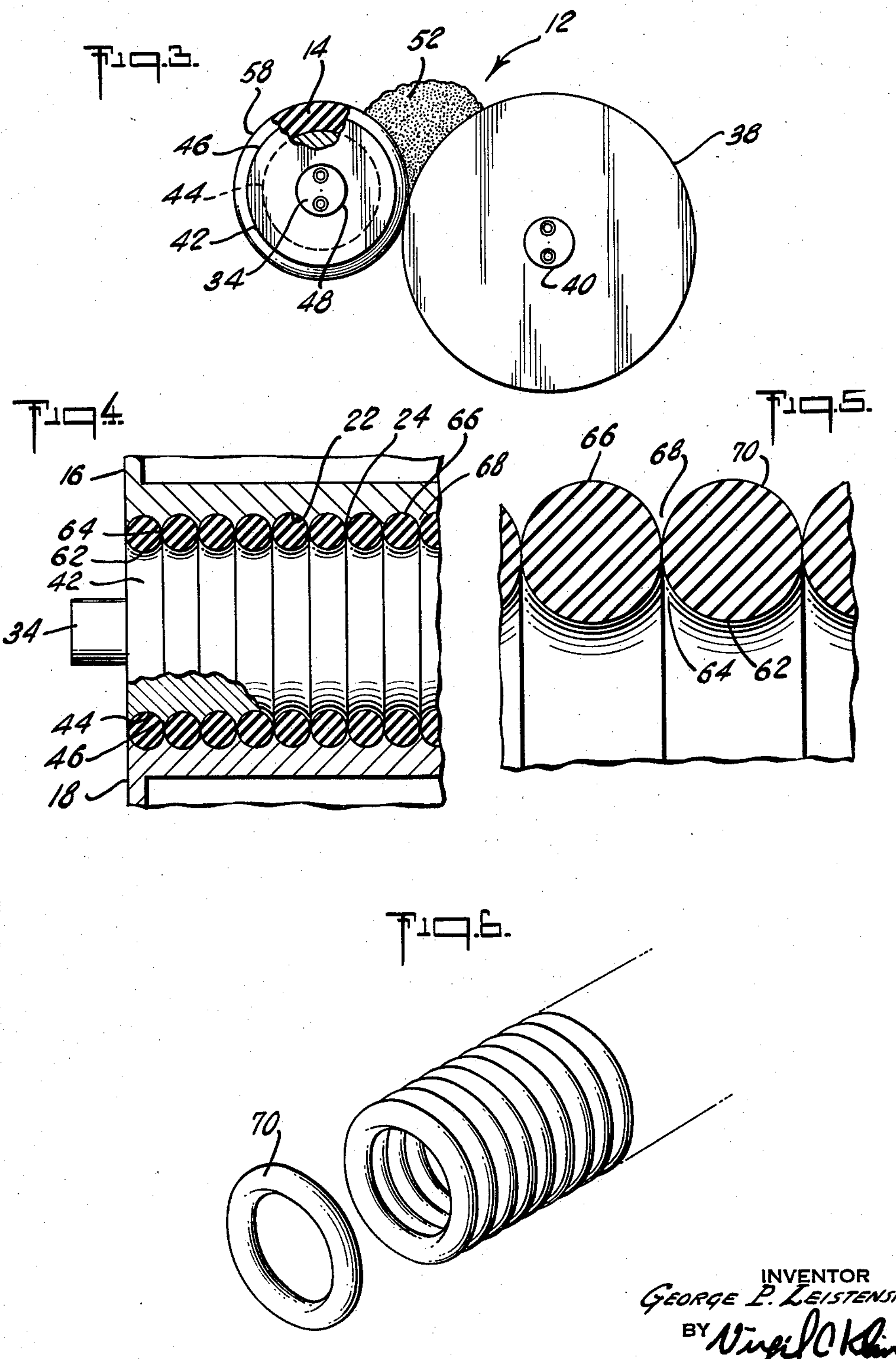
INVENTOR
GEORGE P. LEISTENSNIDER
BY Virgil C Kline
ATTORNEY United States Patent Office 2,945,263

Patented July 19, 1960

2,945,263

METHOD FOR MAKING O-RING GASKETS

George P. Leistensnider, Somerville, N.J., assignor to Johns-Manville Corporation, New York, N.Y., a corporation of New York Filed Oct. 30, 1956, Ser. No. 619,196

2 Claims. (Cl. 18—55)

This invention relates to elastic O-rings, and more particularly, is directed to a method of manufacturing elastic O-ring gaskets, packing and the like, as disclosed and claimed in my U.S. Letters Patent No. 2,646,595, issued July 28, 1953, of which the present application is an improvement.

As disclosed in the above mentioned patent, a jointless O-ring gasket is produced by a cylindrical preform of moldable plastic rubber compound built up on a plurality of mold core segments mounted on a shaft, which preform is circumferentially severed at joints in line with the spacing joints between abutting mold core segments so that each preform loaded mold core segment may be removed from the supporting shaft and be mounted in horizontal position in a mold wherein the preform is molded by heat and pressure to a final O-ring shape and dimension.

The main purpose of the present invention is to provide a new and improved method for producing a jointless O-ring gasket and the like by forming a jointless O-ring preform having a grain which is continuously parallel to the walls and uniform throughout all portions of the preform, and then molding said preform by heat and pressure to form a plurality of jointless O-rings.

It is further the purpose of the present invention to provide a new and improved method for molding jointless O-rings arranged vertically in the mold, thereby considerably increasing production thereof.

It is still further the purpose of the present invention to provide a method for producing a jointless O-ring on which the flash is formed on the outer parallel side walls instead of the inner and outer peripheries, thereby facilitating the removal of such flash. When O-rings are employed as seals between co-axial members, the critical sealing areas are the inner and outer peripheries. Thus the formation of flash on the outer side walls, places the flash in the non-critical areas.

Another object of the present invention is to provide a method of forming O-rings in a novel manner thereby completely eliminating extrusion and cutting processes, and in which method there is less chance of contamination of the final O-ring product due to less handling of the preform stock.

A further object of the present invention is to provide a method of molding O-rings and the like, in which the molding press can be closed immediately after insertion of the center core member regardless of the number of mold cavities therein.

In carrying out the preferred method of the invention, a measured weight of plastic mixture is fed to an undulated mandrel positioned in co-operative relation with a pressing roller. The mixture is calendared, lapped, and compressed upon and about the undulated mandrel by the roller until all of the undulations are sealed with the mixture, and the possibility of any entrapped air being present removed, to form a cylindrical preform having an undulated interior. The mandrel with the preform thereon is then positioned in a molding press for molding and cooling, with the longitudinal axis of the preform and mandrel being transverse to the movement of the press. The cavities of the mold press sections are also undulated, complementary to the undulated mandrel so that upon pressing and heating of the preform a plurality of contiguous O-rings are simultaneously molded into final shape and dimensions.

These and other features of the present invention are described in detail below in connection with the accompanying drawing in which like numerals designate like parts, and in which:

Fig. 1 is a view in perspective of a multi-section O-ring shaping and curing molding press embodying the present invention, including as part of its core a forming and shaping mandrel, with a portion broken away for purpose of illustration, positioned between the spaced elements of the molding press;

Fig. 2 is a view in perspective of an opposed pressure roll assembly for use in forming an O-ring preform in accordance with the present invention;

Fig. 3 is an end view with a portion broken away for purpose of illustration of the opposed pressure roll assembly of Fig. 2, showing a mass of moldable plastic rubber compound subjected to kneading on the pressure rolls;

Fig. 4 is a fragmentary view in section, on an enlarged scale, of the molding press in closed position;

Fig. 5 is a fragmentary view in section, on an enlarged scale, of finished O-rings superficially bonded together adjacent contacting surfaces; and Fig. 6 is a view in perspective of a stack of finished O-rings, showing one O-ring separated therefrom.

Referring now in detail to the drawings, there are shown the principal apparatus elements employed for effecting the method of molding O-rings in accordance with the teaching of the present invention, including a multi-section O-ring molding press unit 10, as shown in Fig. 1, and an opposed roll preform forming unit 12, as shown in Fig. 2. The molding press unit 10 includes a mandrel 14, and relatively reciprocable mold sections 16 and 18. In the particular mold design illustrated, each section of the mold includes half of an O-ring molding cavity 20, the inner surface of which is formed with annular grooves 22 of concave surface separated by annular ridges 24. The two sections 16 and 18 of the molding press unit 10 are arranged to be relatively reciprocated to and from a closed position by a pair of fluid motors connected to each section 16 and 18, as indicated at 26 and 28, respectively. The sections 16 and 18 of the mold 10 may also be heated by heat supplied thereto by means of steam, water or oil, as well known with such apparatus. The heating fluid may be introduced through pipes 30 and 32 extending through the sections 16 and 18, respectively. The heating fluid entering through the pipe 30, as shown by arrows and dotted lines, may circulate through the upper section 16 of the mold 10 and through a shaft 34 of the mandrel 14 for heating the same, and then through the pipe 32 of the lower section 18 into a trap, as illustrated by dotted line at 36.

As shown in Fig. 2, the opposed roll preform forming unit 12 includes a hardened surface steel roll 38, which is similar in mode of operation to a conventional rubber roll mill, and which is mounted on a driven shaft 40. Placed parallel to the shaft 40, and adjustably spaced with respect to the shaft 40, is the shaft 34 of the mandrel 14 to thereby form the other roll of the preform molding unit 12. The mandrel 14 consists of a cylindrical tube or drum 42 of hardened metal having the shaft 34 extending through its bore 48, the outer surface of the tube 42 being formed into alternating grooves and ridges, as indicated at 44 and 46, respectively, with the inner diameter of each groove 44 being the same as the inner diameter of the desired preform rings.

The speed of rotation of the mandrel 14 is adjustable relative to the speed of rotation of the driven shaft 40, by means of a braking mechanism 50 engaging a collar 51 keyed to the shaft 34 for the purposes of developing a differential surface speed between the surface of the mandrel 14 and the surface of the roll 38. It will be understood, however, that any conventional brake mechanism will be suitable for adjusting the speed of the mandrel 14 relative to that of the shaft 40, as well known in the art, and that the brake mechanism 50 is shown merely for purposes of illustration. The opposed rolls of unit 12 are operated with such close spacing as to support a bank 52, as best shown in Fig. 3, of rubber-like preform forming material above the bite of the rolls throughout the preform forming operation, it being understood that the mandrel 14 and roll 38 are rotated so that their peripheries move downwardly at bite 54. As in conventional practice with apparatus of this type, the opening or bite 54 between the rolls 14 and 38 of the preform forming unit 12 is gradually widened as by means of suitable counterbalenced swing support 56 for the shaft 40, in order to permit gradual building up of a cylindrical preform 58 by circumferentially lapping and pressing about the periphery of the tube 42, as the rolls 14 and 38 rotate. The mandrel 14 and the roll 38 may also be arranged to be cooled by a fluid medium, such as water, circulating through the shafts 34 and 40, in a conventional manner, as illustrated by arrows and dotted lines at 60. In this manner, the tube 42 of the mandrel 14 while being on the preforming mill device 12 will be water cooled so that the tube 42, when being loaded with the rubber stock, can keep the rubber stock or preform 58 in a cool and unvulcanized state during the operation and also will permit safe storage of the loaded tube 42 when it is not to be placed in the curing mold 10 immediately.

As disclosed in the afore-mentioned patent, flexible O-ring gaskets or packing elements which are produced by the present method are not limited as to composition. Almost any suitable vulcanizable rubber composition can be used which is moldable and heat curable to a flexible ring of satisfactory wearing properties. For most purposes, it is preferred to employ a vulcanizable mix containing as a matrix a rubber-like material selected from the group consisting of natural rubber and synthetic rubbers, such as polychloroprene and copolymers of butadiene and acrylonitrile, or mixtures of these materials. Fillers are incorporated with the rubber-like matrix to impart suitable reinforcing and vulcanizing characteristics. Both organic and inorganic fillers are usually employed, including carbon black, short fibered asbestos, organic anti-oxidants, waxes, rosins, and other rubber compounding materials.

As an example of a suitable composition for use in the O-ring preform forming, molding and curing process, the following formula expressed in weight percentages has proven satisfactory:

| | Percent |
|---|---|
| Eynthetic rubber | 52.0 |
| Powdered zinc oxide | 2.6 |
| Stearic acid | .6 |
| Phenol-beta-naphthylamine | 1.2 |
| Dibenzyl sebacate | 7.7 |
| Wax plasticizer | .8 |
| Vulcanizing agents including sulfur | 1.7 |
| Cure accelerator | .4 |
| Carbon black | 33.0 |

The mixture of rubber-like binder and organic and inorganic filler materials can be made up into a dough-like mass on a conventional rubber mixing mill to develop a suitable consistency for molding, prior to the time of charging the preform forming unit of the present apparatus.

The preform forming unit 12 is illustrated in the position which it assumes at the end of a preform forming cycle in which a mass 52 of a measured thickness of premixed plastic vulcanizable rubber-like material has been built up on the mandrel 14 into the preform 58, as outlined in dotted lines in Fig. 2 and as shown in Fig. 3, having a volume which fills the grooves 44 in the outer surface of the tube 42 and the grooves 22 in the cavity 20 of the molding press 10. The thickness of the material built up on the mandrel 14 may preferably be slightly in excess of that required to completely fill the grooves 22 and 44 during the molding operation. The amount of the material, however, originally employed can be such so that at the end of the forming cycle no material in excess of that required may remain. However, if any material in excess of that required remains, it may be removed in any conventional manner before molding. The opposed roll unit 12 is shown in Figs. 2 and 3 in the position of substantially maximum spacing of the shafts 34 and 40 to provide a bite between the mandrel 14 and the roll 38 wide enough to build up the tubular preform 58 to final thickness on the slower moving mandrel 14. The preform 58 is thus formed with its inner surface formed into inwardly protruding ribs 62 of convex surface separated along the length of the preform 58 by annular depressions 64, as best shown in Fig. 4.

The preform loaded tube 42 of the mandrel 14 may be removed from its supporting shaft 34 in the preform forming unit 12 and be mounted on another shaft 34 already preheated in the mold 10, as shown in Fig. 1. With the mandrel 14 thus positioned in the mold 10, the mold sections 16 and 18 may be brought into engagement with the preform 58 in the mandrel 14, and as the mold 10 is closed, the mold sections 16 and 18 force the preform 58 to fill the grooves 22 in the mold cavity 20 as shown in Fig. 4. With complete closure of the mold 10, the outer surface of the preform 58 is formed into a series of outwardly protruding ribs 66 separated by a corresponding series of depressions 68, the ribs 66 complementing the ribs 62 on the outer surface of the preform 58, to complete the generally circular cross section of each O-ring gasket, as best shown in Fig. 5. The preform 58 is thus molded to final O-ring shapes, and thereafter a heat cure is effected, as by means of steam or other heating medium circulating through the pipes 30 and 32 and through the shaft 34, thereby heating the mandrel 14 and the walls of the molding cavity 20. After molding and curing the preform 58 into O-rings 70, the tube or drum 42 with the cured O-rings 70 may be removed from the mold cavity 20, and the tube 42, stripped of the O-rings 70, may be again mounted on the shaft 34 preparatory to the service with the preform forming unit 12 producing another preform 58. It will be noted that it is preferred to employ two shafts 34, one of which may always remain in the molding press 10 for preheating purposes, and the other may be employed for service only with the preform forming unit 12 for precooling purposes. However, only one shaft 34 may be employed if desired. It will also be understood that the mandrel 14 functions to support the O-ring preform 58 not only while being formed in the preform forming unit 12, but also, while being molded by heat and pressure to O-rings of final shape and dimensions.

As shown in Fig. 5, the O-rings 70 may be superficially bonded together adjacent contacting side surfaces into a tubular form, and each O-ring 70 may be separated by being pulled apart from the adjoining O-ring, as shown in Fig. 6. Any flash formed on the contacting side surfaces of the O-rings by the superficial bond may be easily removed if desired. However, the flash may be left on the O-rings since it is not formed on the inner and outer peripheries of each O-ring and thereby does not interfere with the proper operation of the O-ring.

The present invention has been described in detail above for purposes of illustration only and is not intended to be limited by this description or otherwise except as defined in the appended claims.

What I claim is:

1. The method of simultaneously forming a plurality of elastic O-rings suitable for use as sealing members, which comprises: calendaring and simultaneously circumferentially lapping and compressing a moldable plastic mixture comprising thermosetting binder and filler material upon an undulated mandrel to form thereon a jointless tubular preform having an undulated inner surface; and pressure molding and thermocuring said preform in an undulated die in a manner to form an undulated outer surface on said preform which complements the undulated inner surface to define a plurality of O-rings on said mandrel of final shape and dimensions.

2. The method of simultaneously forming a plurality of elastic O-rings suitable for use as sealing members, which comprises: shaping a measured weight of plastic mixture comprising thermosetting binder and filler material by calendaring and simultaneously circumferentially lapping and pressing said mixture about and upon an undulated mandrel to form thereon a jointless annular preform having an undulated inner surface; and pressure molding said preform in an undulated die by the application of pressure in a direction transverse to the central axis of the preform to form an undulated circumferential surface upon said preform in a manner whereby the undulations of said inner and outer surfaces complement each other to define a plurality of O-rings on said support of final shape and dimensions.

References Cited in the file of this patent

UNITED STATES PATENTS

| | | |
|---|---|---|
| 335,935 | Kipper | Feb. 9, 1886 |
| 1,576,184 | Freeman | Mar. 9, 1926 |
| 2,510,840 | Stowe | June 6, 1950 |
| 2,646,595 | Leistensnider | July 28, 1953 |